United States Patent [19]

Chiou et al.

[11] Patent Number: 5,729,402
[45] Date of Patent: Mar. 17, 1998

[54] LOGIC CONTROLLED CASSETTE TAPE RECORDING AND/OR REPRODUCING APPARATUS

[75] Inventors: Chyi-Fwu Chiou; Ming-Jer Chiu, both of Hsin-Chu, Taiwan

[73] Assignee: Industrial Technology Research Institute, Hsinchu, Taiwan

[21] Appl. No.: 596,917

[22] Filed: Mar. 13, 1996

[51] Int. Cl.⁶ .................................................. G11B 15/18
[52] U.S. Cl. ............................................ 360/96.1; 360/137
[58] Field of Search ............................. 360/96.1, 96.2, 360/96.3, 96.4, 137, 71

[56] References Cited

U.S. PATENT DOCUMENTS

| 4,896,234 | 1/1990 | Watanabe et al. | 360/105 |
| 5,191,490 | 3/1993 | Tyouno et al. | 360/71 |

Primary Examiner—Stuart S. Levy
Assistant Examiner—William J. Klimowicz
Attorney, Agent, or Firm—Bacon & Thomas

[57] ABSTRACT

A power transmission and mode change mechanism for a logic controlled cassette tape recording and/or reproducing apparatus employs a single motor as a power source for high and low speed tape winding and mode changing and a single solenoid for control of a partially toothed cam mechanism which in turn controls setting of the modes.

4 Claims, 17 Drawing Sheets

312  336

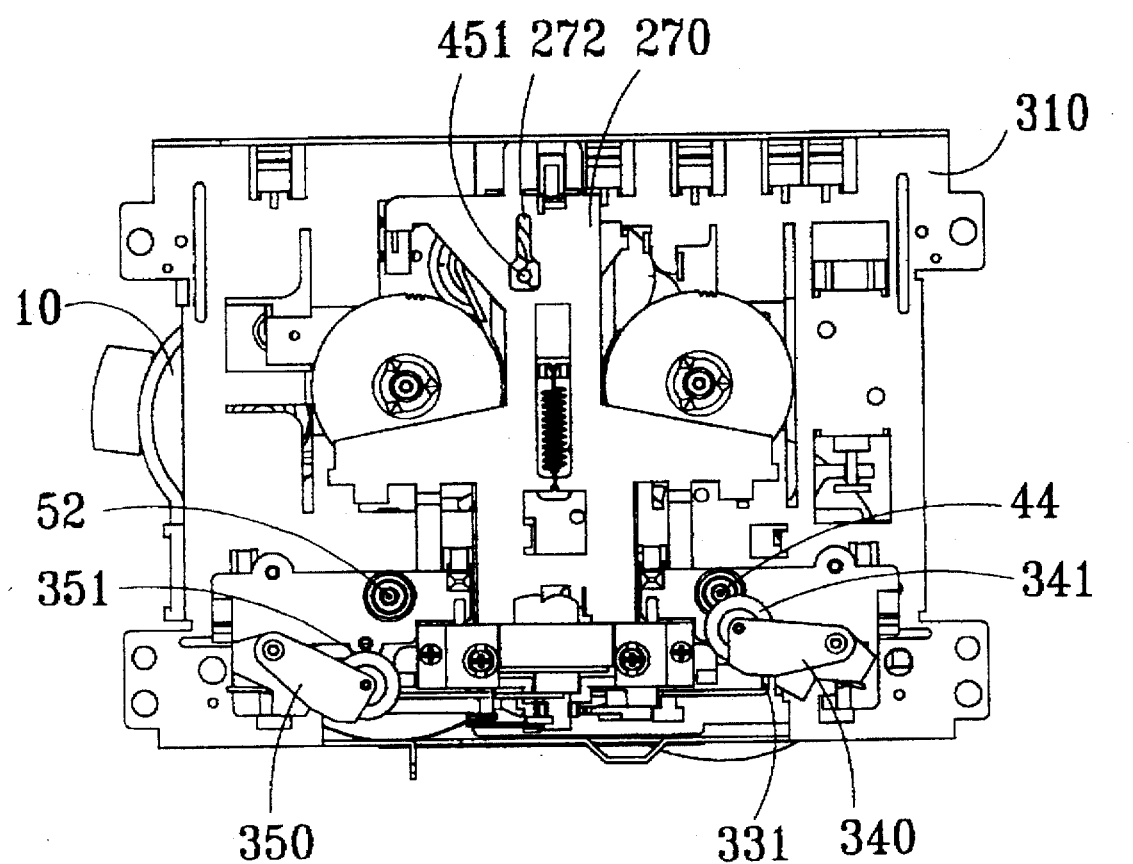
FIG. 19
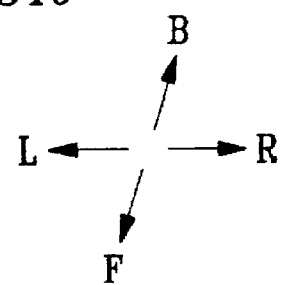

LOGIC CONTROLLED CASSETTE TAPE RECORDING AND/OR REPRODUCING APPARATUS

BACKGROUND OF THE INVENTION

1. Field of the Invention

The present invention relates to a power transmission and mode changing mechanism for a new logic controlled cassette tape recording and/or reproducing apparatus employing a partially-toothed cam assemblage. The newly developed unit greatly simplifies the construction and components of the apparatus compared to that of the conventional one and, in addition, lowers production costs and assures accurate and reliable operation.

2. Description of the Prior Art

The construction of a conventional logic controlled cassette tape recording and/or reproducing mechanism usually can be classified in one of three categories. The first category of apparatus employs three motors for its power source, one for driving a magnetic tape winding reel, the second for driving the capstan spool for the magnetic tape, and the third for controlling positions of a magnetic head and pinch rollers.

The second category of apparatus is basically similar to the first one, except that the second one employs two motors instead of three for its power source by commonly using one motor for driving the capstan spool for the magnetic tape and controlling positions of the magnetic head and pinch rollers.

The third category of apparatus utilizes only one motor as a power source, the motor being associated with two solenoids for controlling the operation of elements of mechanism in various ways. All of the three categories of apparatus have the common shortcomings of complicated construction and excessively high assembling an manufacturing costs.

SUMMARY OF THE INVENTION

For the purpose of overcoming the above-mentioned shortcomings the present invention utilizes only one motor as the source of driving power, and one solenoid associated with a partially toothed cam and other elements to provide an apparatus which is simple in construction, easy to operate, reliable in operation, and greatly reduces production costs.

The present invention utilizes one single motor as the source of the output power. By means of a belt and belt pulley, the motor drives the tape capstan, and through a capstan gear the power is transmitted to a partially toothed cam. On the other hand, driving power is applied through the belt and wheel, which run together with the rotation of the capstan, to a rapid rotation rocker arm on the belt wheel, and the motion is controlled and adjusted by a torsion limiter of the rocking arm.

A wool pad presses the shaft on the disk base to produce torque and drive with friction the rocking gear and pinion. The driving force is continuously applied to the winding wheel and finally becomes the power required for selecting and winding tape. A cam controlling rocking arm is actuated by a single solenoid which forces the partially toothed cam to rotate, causing the teeth of the cam and those of the related capstan to mesh with one another to stop the rotation of the partially toothed cam, and thereby select a mode of operation.

Furthermore, to compensate for the gradual increase in the radius of the tape during playback, the present invention causes a pinion of the rapid rotation rocker arm or lever to mesh with an idler wheel, the power being transmitted to the spring of the torsion limiter so that the playback rocking lower gear and the wool pad are squeezed against the playback rocking upper gear, resulting in sliding rotation with friction. The torsion limiter for the rapid rotation rocker arm that maintains the constant rotating speed required by the tape capstan is formed by the wool pad, disk base, spring, belt pulley for the rapid rotation rocker arm, and a rocking gear.

BRIEF DESCRIPTION OF THE DRAWINGS

The invention, as well as its many advantages, may be further understood by the following detailed description and drawings in which:

FIG. 19 is a top view of the mechanism of the present invention in its forward playback state.

DETAILED DESCRIPTION OF THE PREFERRED EMBODIMENT

The preferred embodiment of the present invention is a logic controlled cassette tape recording and/or reproducing apparatus having a dual track reversible head which can play either in the forward or backward direction, and a fast rewind mode.

Figure 2:
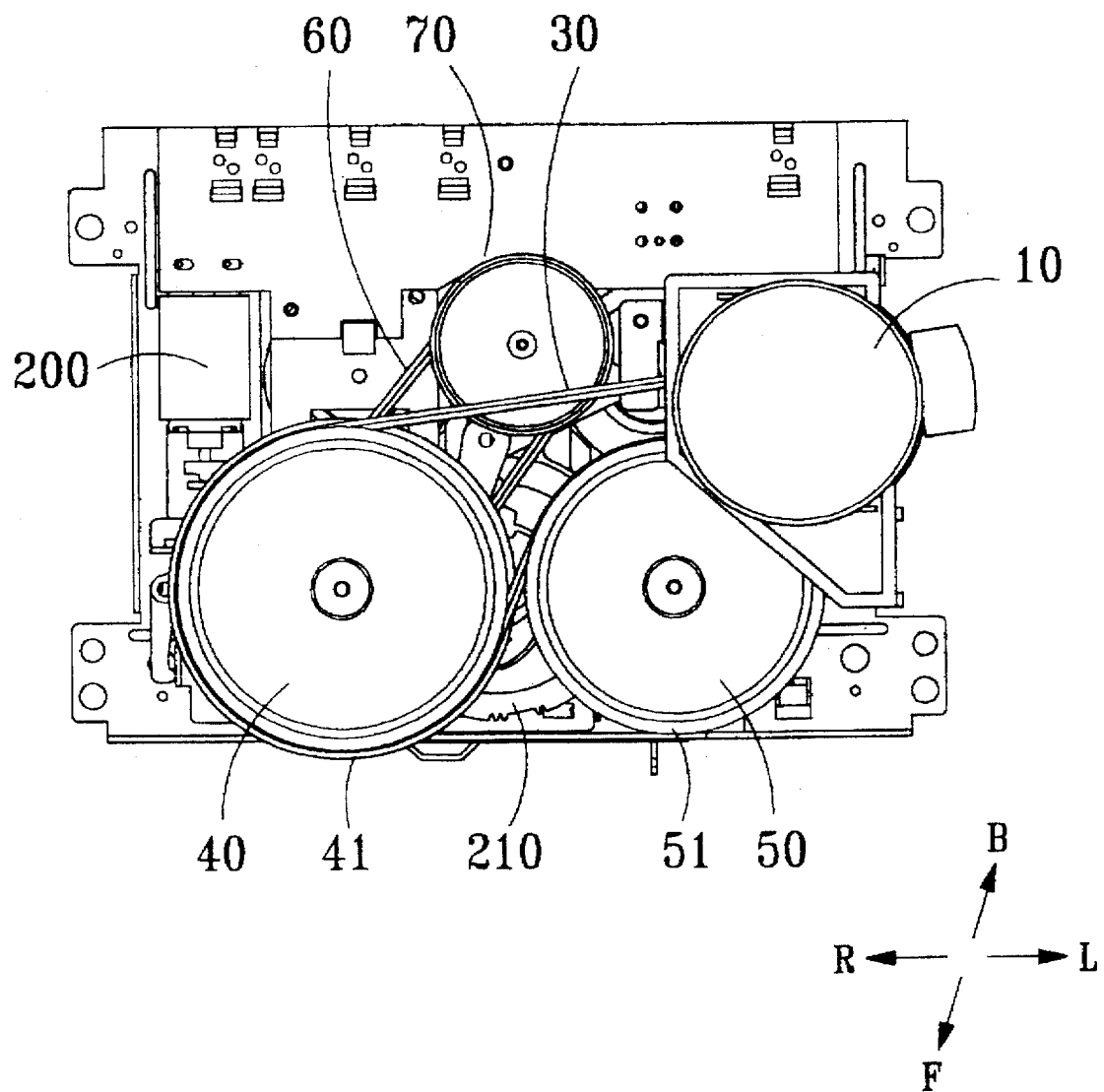
FIG. 2 is a bottom view of the embodiment of FIG. 1.
Figure 3:
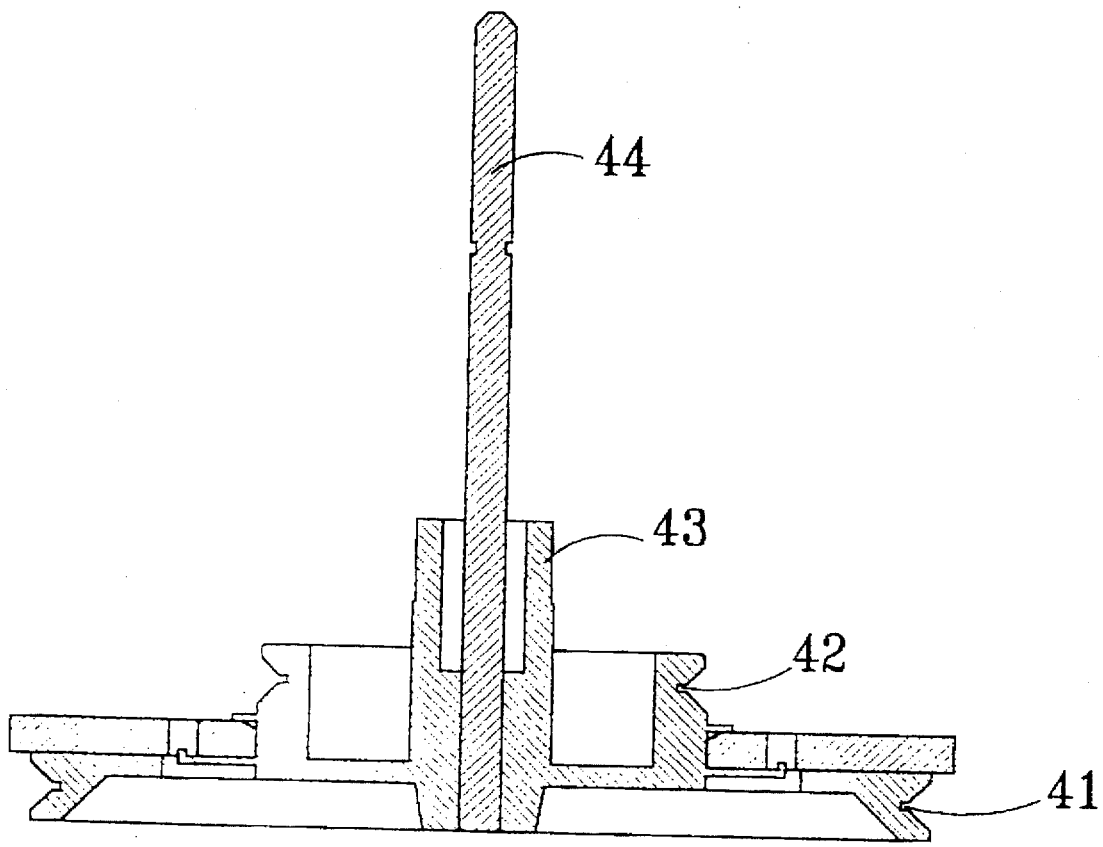
FIG. 3 is a cross-sectional view of the forward direction capstan.

As shown in FIG. 2, motor 10 transmits power as follows: The power delivered by motor 10 is transmitted through belt pulley 20, belt 30, belt pulley 41, and belt pulley 51 to drive forward capstan 40 and backward capstan 50. A gear 43 rotates together with forward capstan 40, shown in FIG. 3, and drives partially toothed cam 210.

Figure 4:
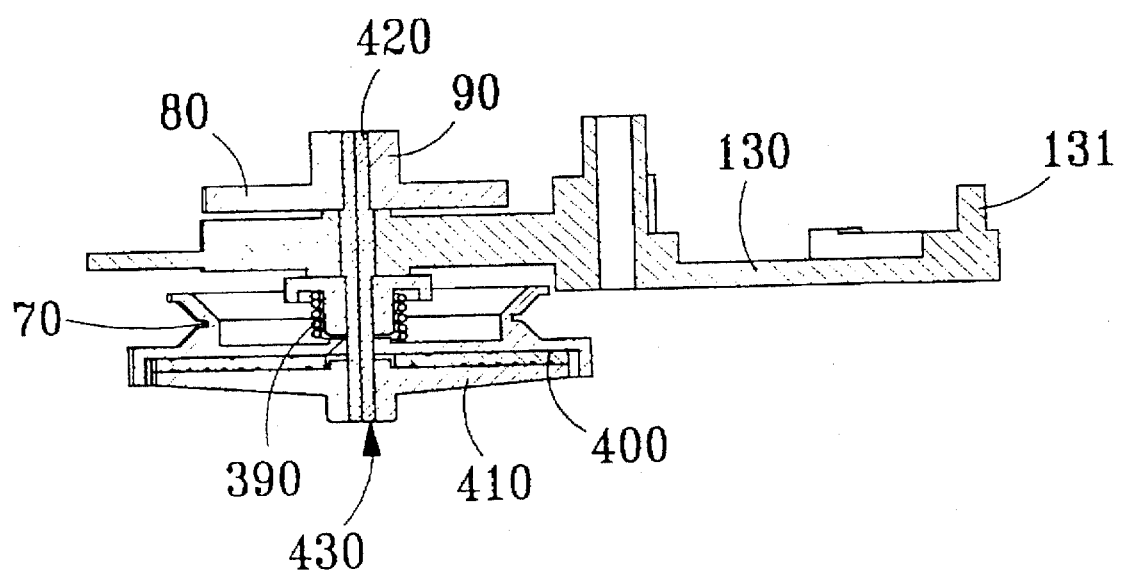
FIG. 4 is a cross-sectional view of the torsion limiter for the rapid rotation rocker arm of the present invention.

On the other hand, the output of motor 10 is transmitted via belt pulley 42, which rotates together with forward capstan 40 and belt 60, to a belt pulley 70 for the rapid rotation rocker arm 430 of a torsion limiter, as shown on FIG. 4, and continuously to rocking gear 80 and rocking pinion 90. In this example, the torsion limiter for rapid rotating rocking arm 430 presses belt pulley 70 and wool pad 400 against disk base 410 by means of spring 390, and finally power output is developed on the shaft 420 of disk base 410. Rocking gear 80 and rocking pinion 90 form a transmission unit with shaft 420. The rocking gear 80 transmits the driving power to forward winding reel 160 and backward rewinding reel 170 as a rapidly rotating power source for selecting or rapid winding, while the rocking pinion 90 transmits its driving power to forward winding reel 160 and backward rewinding reel 170 as a slow rotating power source for playback.

Figure 5:
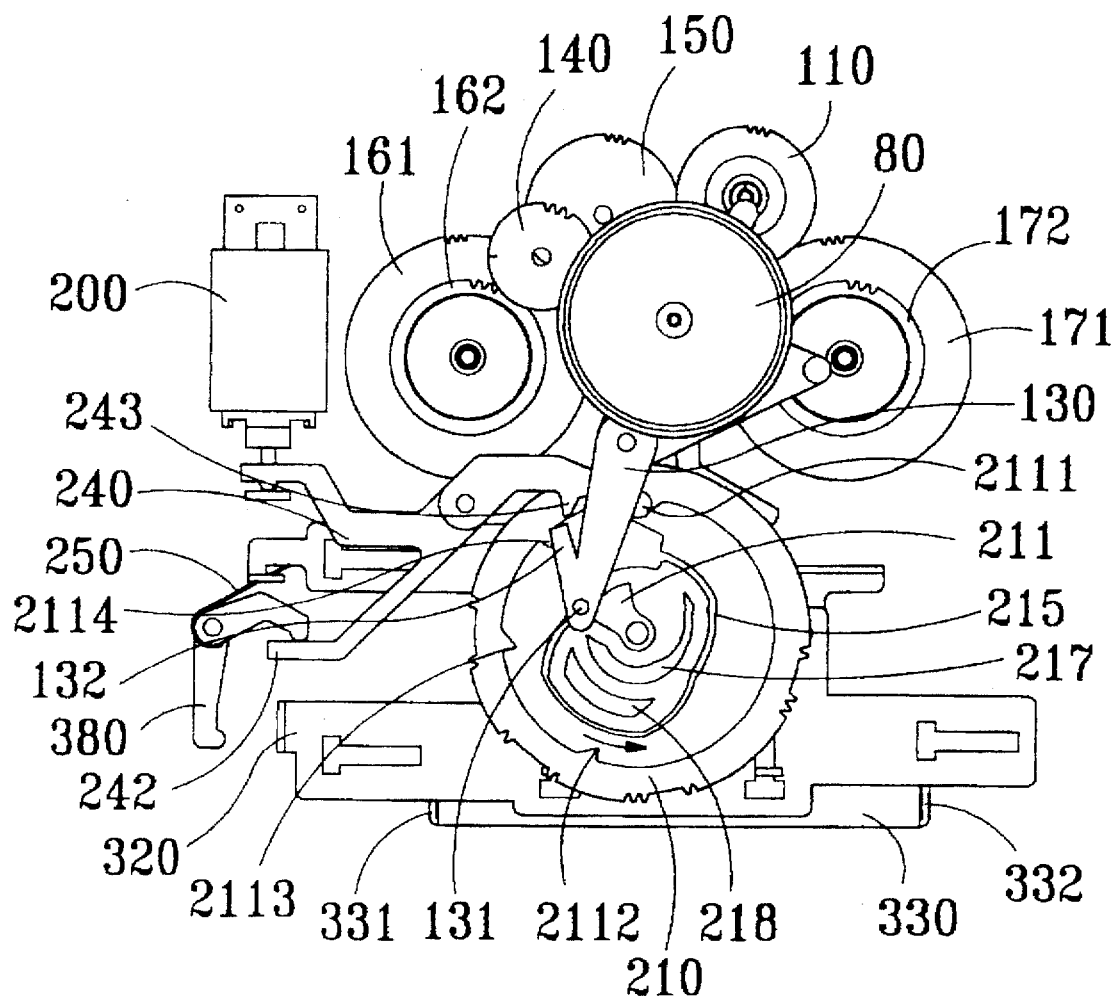
FIG. 5 shows a portion of the power transmission and mode change mechanism of the present invention.
Figure 6:
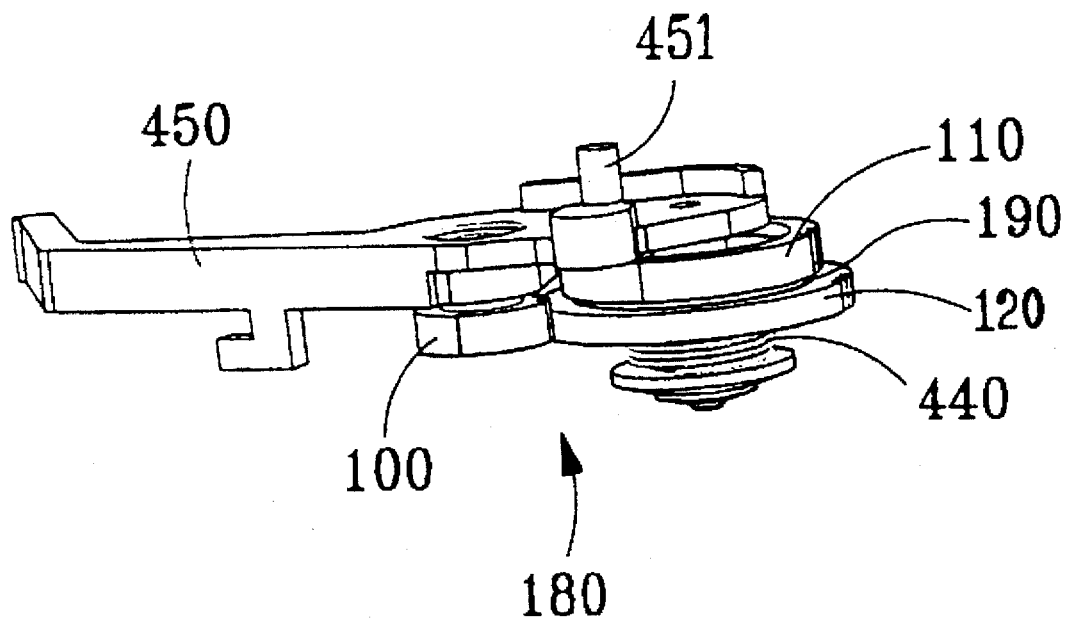
FIG. 6 is a perspective view of the playback torsion limiter.

As shown in FIG. 5, when the rapid rotation rocker arm 130 is in its neutral position without the rocking gear 80 having meshed with the rapid rotation idle wheel 140, or the backward rapid rotation gear 172 of the backward rewinding reel 170, the rocking pinion 90 positively meshes with the idle wheel 100 and transmits power to playback rocking lower gear 110 of playback torsion limiter 180. Power is further transmitted to playback rocking upper gear 120 (as shown in FIG. 6) through wool pad 190.

In the present invention, the construction of playback torsion limiter 180 is such that by utilizing the force of spring 440, playback rocking lower gear 110 and wool pad 190 are both pressed against playback rocking upper gear 120, producing a relative frictional sliding rotation between playback rocking lower gear 110 and playback rocking upper gear 120 which compensates for the gradual increase in the radius of a tape being played (not shown), which is necessary for the tape to keep a uniform winding speed when playing back. Similarly, the slippage satisfies the requirement that both the forward winding reel 160 and backward rewinding reel 170 must change their rotating speeds from time to time when playing back, permitting the rotating speed of the playback rocking upper gear 120 to be adjusted accordingly.

Control of partially toothed cam 210, which determines the operation modes of the present invention, is based on the stopping positions of partially toothed cam 210. There are four stoppers 211 on the surface of partially toothed cam 210, and each stopper 211 is associated with its own mode. For instance, 2111 represents stopping, 2112 represents playback, 2113 represents searching, 2114 represents rapid winding. When cam controlling rocking arm 240 with its rudder 241 is stopped at any one of the four stoppers (2111-2114), no teeth on the cam are coincident with the relative meshing position of gear 43 (FIG. 3), and consequently partially toothed cam 210 stops rotating due to power interruption.

Assuming that partially toothed cam 210 initially stops at the position corresponding to one of the stoppers 211 (2111-2114), once cam controlling rocking arm 240 starts to rotate due to the pulling force exerted by energized solenoid 200, rudder 241 separates from its stopped position on one of the stoppers 211 and releases the locking state of partially toothed cam 210. Forward sliding plate 260 and drive rudder 261 exert a force on head position controlling cam 212, and by means of an eccentric force exerted off the center of partially toothed cam 210 by drive rudder 261, which is associated with the motion of head position controlling cam 212, partially toothed cam 210 produces a rotating torque which makes the teeth of cam 210 mesh those of the gear 43, and the partially toothed cam 210 goes on rotating until it reaches the next stopper (2111-2114). If solenoid 200 has not been energized at this moment, rudder 241 will hold at the position of stopper 211 by the force of spring 250 and stop partially toothed cam 210 from rotating. In this way, various different operations are performed. FIG. 5 shows the rotating direction of partially toothed cam 210, the order of the modes controlled thereby being stop→playback→searching→rapid winding.

Figure 7:
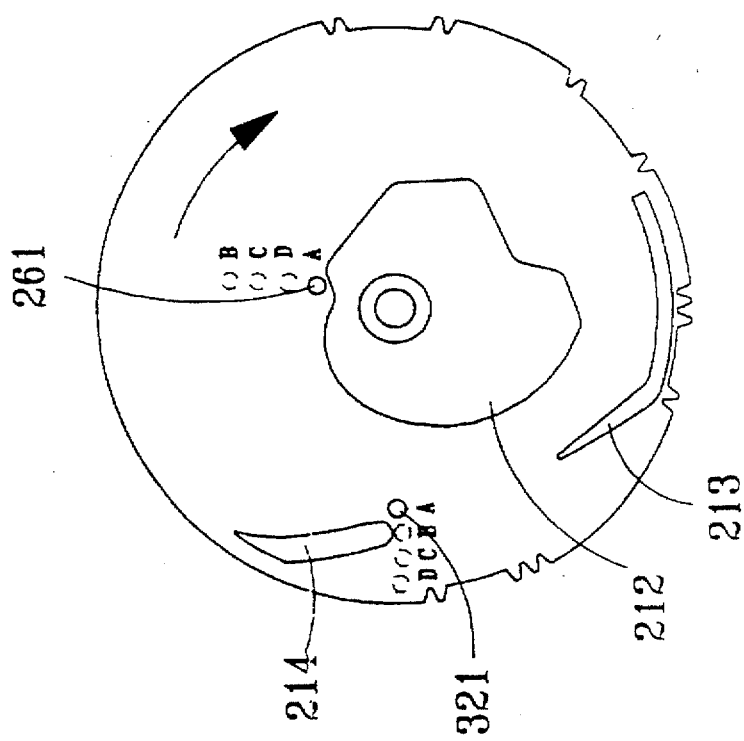
FIG. 7 shows one side of the partially toothed cam of the present invention.
Figure 8:
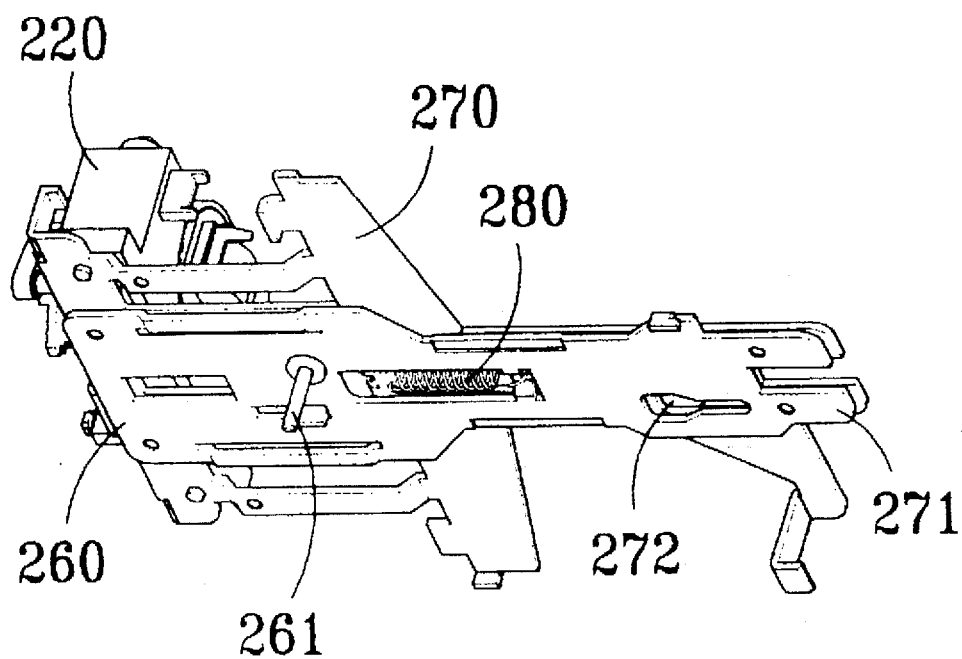
FIG. 8 is a perspective view of the assembly of the onward slideplate and head base slide plate of the present invention.
Figure 9:
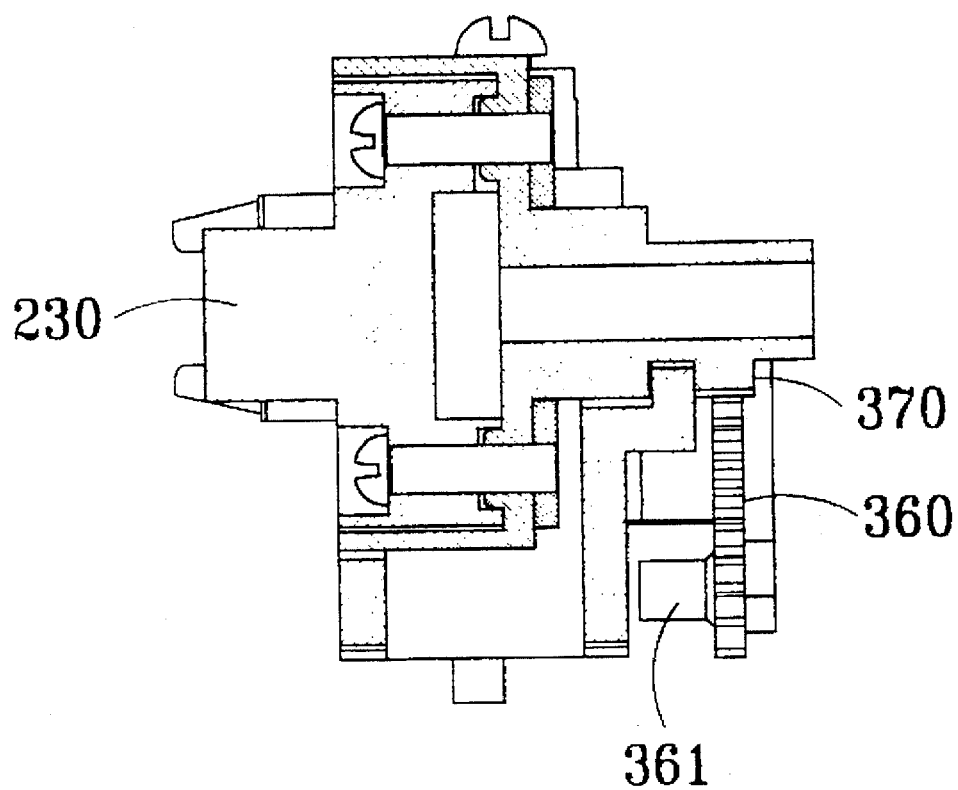
FIG. 9 is a side view of the head assembly.

The procedure for position control of the head assembly 220 is as follows: The principal function of head position controlling cam 212 located on partially toothed cam 210 is to control the location of forward slide plate 260 relative to rudder 261. The relative positions of the drive rudder 261 and head position controlling cam 212 for various modes are shown in FIG. 7. Positions A,B,C,D represent all of the modes of stopping, playback, searching, and rapid winding respectively. As drive rudder 261 can only move forward and backward, it is able to control forward slide plate 260 to stop at each different mode positions when partially toothed cam 210 rotates. Forward slide plate 260 also can draw the sliding base plate 270 for the magnetic head by the action of spring 280 to vary the position of head assembly 220, as shown on FIG. 8. Head assembly 220 is fixed on sliding base plate 270, and the construction of head assembly 220 is as shown on FIG. 9.

According to the present invention, before forward slide plate 260 reaches the playback mode position, terminal face 271 is stopped by projection 311 of base plate 310 and remains there. As forward slide plate 260 reaches the playback position, spring 280 holds it in an extended state to keep head 230 stopped at the exact working position.

When drive rudder 261 changes its position from A to B, controlling slide plate 330 for the playback rocking arm is displaced forward or backward together with forward sliding plate 260 because drive rudder 261 has passed through slide groove 333 of controlling slide plate for playback rocking arm 330. Therefore projection 331 of controlling slide plate 330 for the playback rocking arm will press forward pinch roller assembly 340 to maintain the forward playback mode, while projection 332 of controlling slide plate 330 will press backward pinch roller assembly 350 to maintain the backward playback mode.

By releasing the energy stored in restoring springs (290, 300) for the two pinch roller assemblies (340, 350), forward slide plate 260 is changed from the playback mode to any other mode, such as searching, rapid winding, or stopping.

Figure 10:
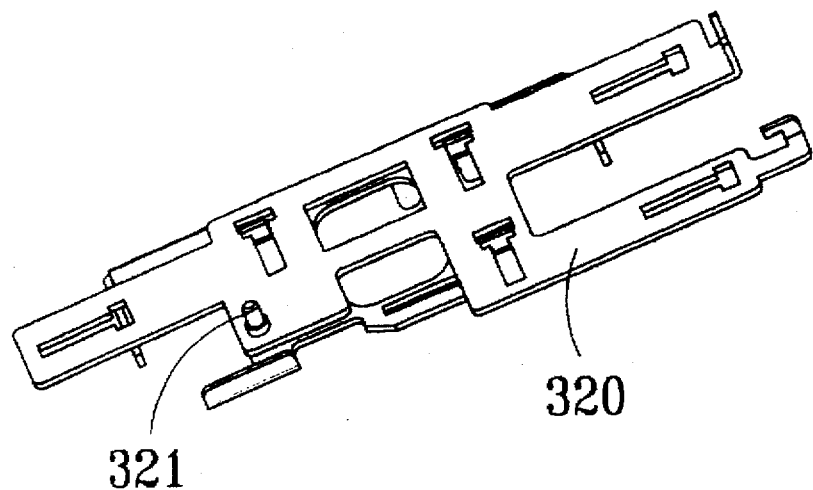
FIG. 10 is a perspective view of the directional slide plate of the present invention.
Figure 11:
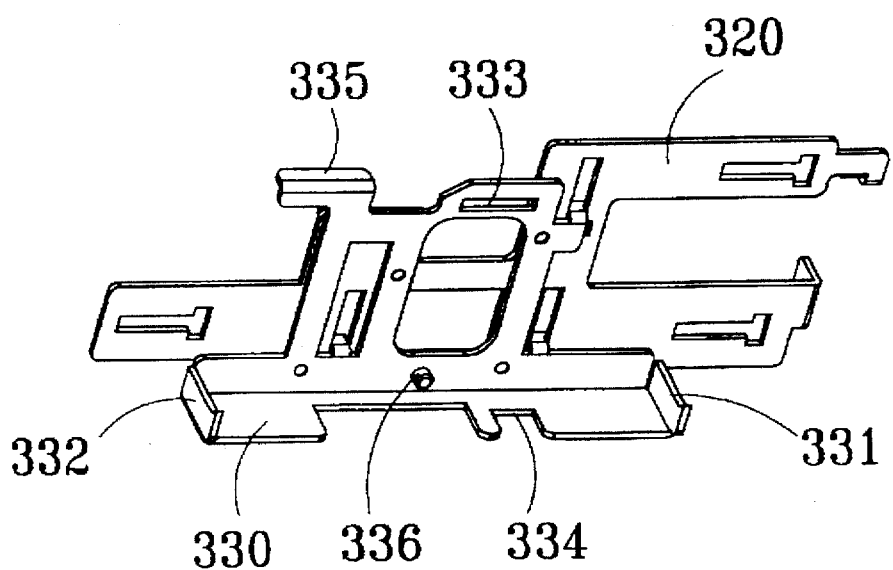
FIG. 11 is a perspective view showing a slide plate assembly for controlling the playback rocking arm and directional slide plate of the present invention.

The procedures for directional control of head 230 are as follows: head 230 is at its forward position during the stop mode. When solenoid 200 is energized and produces a pulling force to rotate cam controlling rocking arm 240, because rudder 241 of cam controlling rocking arm 240 does not restrain it, partially toothed cam 210 continues to rotate, and supporting arm 242 of cam controlling rocking arm 240 moves with the turning of rocking arm 380 to cause direction slide plate 320 (as shown on FIG. 10) to move in the L direction (FIG. 5). Referring to FIG. 11, as slide plate for controlling playback rocking arm 330 combines with directional slide plate 320, both slide plates will move in the L direction simultaneously, and at the same time rudder 321 for directional slide plate 320 displaces from position A to B as show on FIG. 7. If it is intended that head 230 should be held in the forward playback mode or the searching mode, solenoid 200 de-energizes before cam 213 collides with rudder 321, and rudder 321 returns to position A again due to the action of restoring spring 250 for directional slide plate 320. Accordingly, cam 320 does not drive rudder 321 to move when the former passes through the latter, and both directional slide plate 320 and slide plate for controlling playback rocking arm 330 return to the stopping mode position together. Cam 214 also does not collide with rudder 321 and head 230 is still able to keep its forward position.

If it is intended that head 230 should be held in the backward playback or searching modes, solenoid 200 is actuated and driving cam 213 pushes rudder 321 from position B to position D. At the same time, directional slide plate 320 and slide plate 330 for controlling the playback rocking arm slide together with rudder 321. As rudder 321 is moved to position D, the concave slot 334 for slide plate 330 drives rudder 361 of gear 360 to rotate, and through its meshing gear 370 to further drive head 230 to perform the purpose of changing direction.

After head 230 has been switched to its backward position, rudder 321 returns to the C position due to the movement of directional slide plate 320 actuated by spring 250. At this moment, head 230 will still stay at the backward position due to gaps existing among those transmitting elements which drive the head 230. Before head 230 returns to the stop mode from its backward position, rudder 321 is removed from position C to position A by cam 214, and rudder 361 is driven by directional slide plate 320 and concave groove 334 of slide plate 330, and finally the head 230 returns to its forward position.

Figure 12:
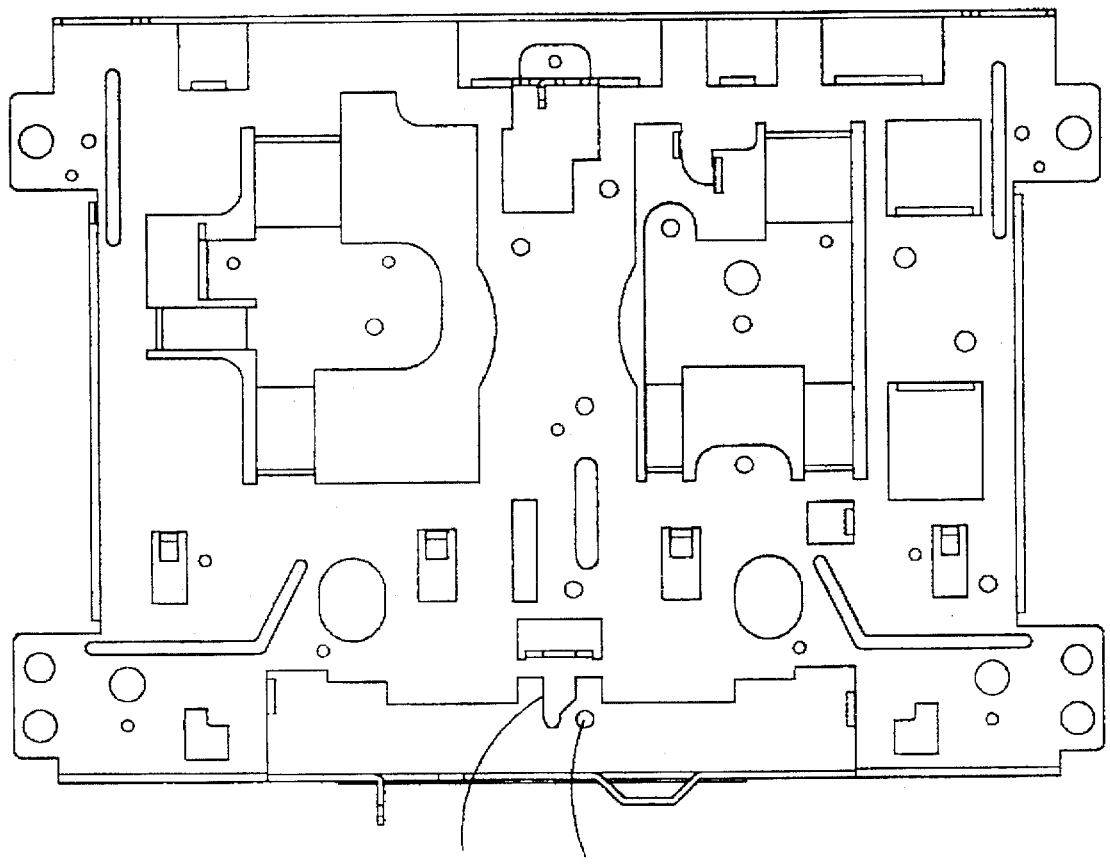
FIG. 12 is a plan view of the bottom plate of the preferred embodiment of the present invention.
Figure 12:
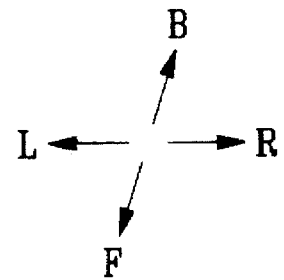

As shown on FIG. 12, as rudder 321 passes through cam 213 but has not reached cam 214, rudder 336 for slide plate 330 is guided by guide projection 312 of bottom plate 310. Even though solenoid 200 is energized at this moment, the position of slide plate 330 is guided by guide projection 312 of the bottom plate 310, and the position of slide plate for controlling playback rocking arm 330 still remains unchanged. Consequently, the direction of head 230 is also not affected.

The procedures for position control of rapid rotation rocking arm 130 are as follows: the working positions for rapid rotating rocking arm 130 include a neutral position between the stop and the playback modes, a forward position for the forward searching mode and forward rapid winding mode, and a backward position for the backward searching mode, and backward rapid rewinding mode, with control of the positions being executed by partially toothed cam 210.

Figure 13:
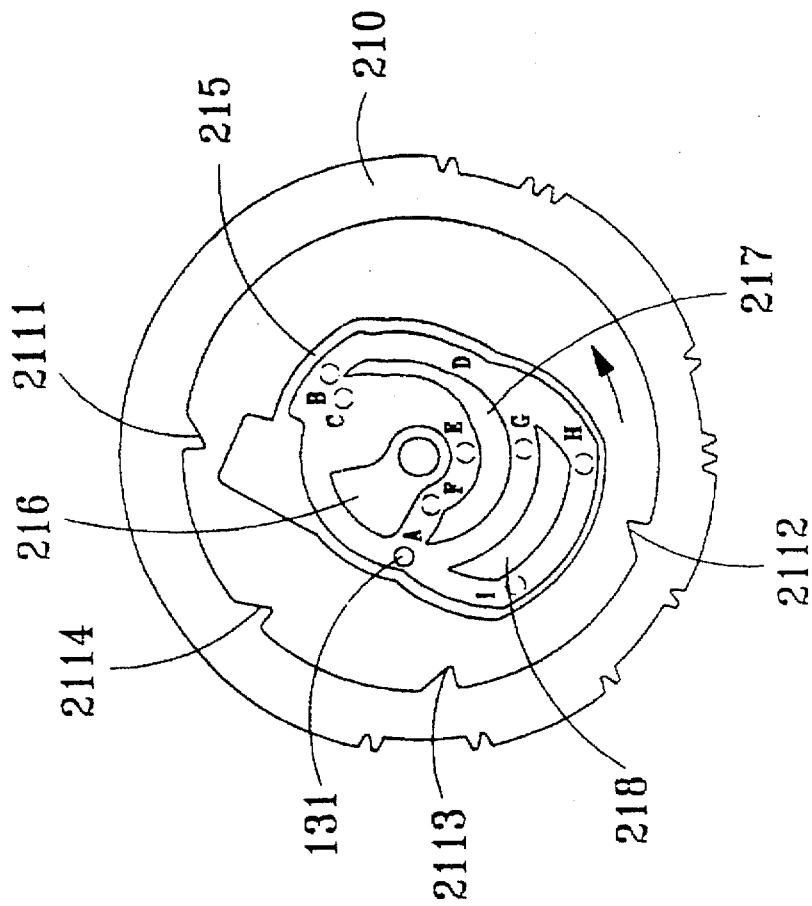
FIG. 13 shows the other side, relative to the view shown in FIG. 7, of the partially toothed cam of the present invention.

As shown in FIG. 13, position A for partially toothed cam 210, like the position A shown on FIG. 5, is the working position for the stop mode. Assuming that rocking gear 80 stays at the neutral position, if rudder 131 moves from position A to a forward position, which sets the apparatus on position E or F, before rudder 131 is about to catch up with cam 217, solenoid 200 is energized to press projection 243 on cam controlling rocking arm 240 against the pressure receiving surface 132 of rapid rotating rocking arm 130, and further push the rudder 131 to the position C, after which rudder 131 is led to position E or F by cam 217 as shown on FIG. 13.

To move rudder 131 from the first position to the backward position, which sets the apparatus at position H or I, before rudder 131 is about to catch up with cam 217, solenoid 200 is de-energized so that projection 243 on cam controlling rocking arm 240 does not touch rapid rotation rocking arm 130, and due to the action of restoring spring 460, rudder 131 on rapid rotation rocking arm 130 reaches and is guided to position B by cam 215 and cam 217 as show on FIG. 13. As rudder 131 passes through cam 215, solenoid 200 is still de-energized, and due to the action of restoring spring 460, rudder 131 moves to the outside of partially toothed cam 210 and is guided to position H or I by cam 218, as shown on FIG. 13.

Figure 1:
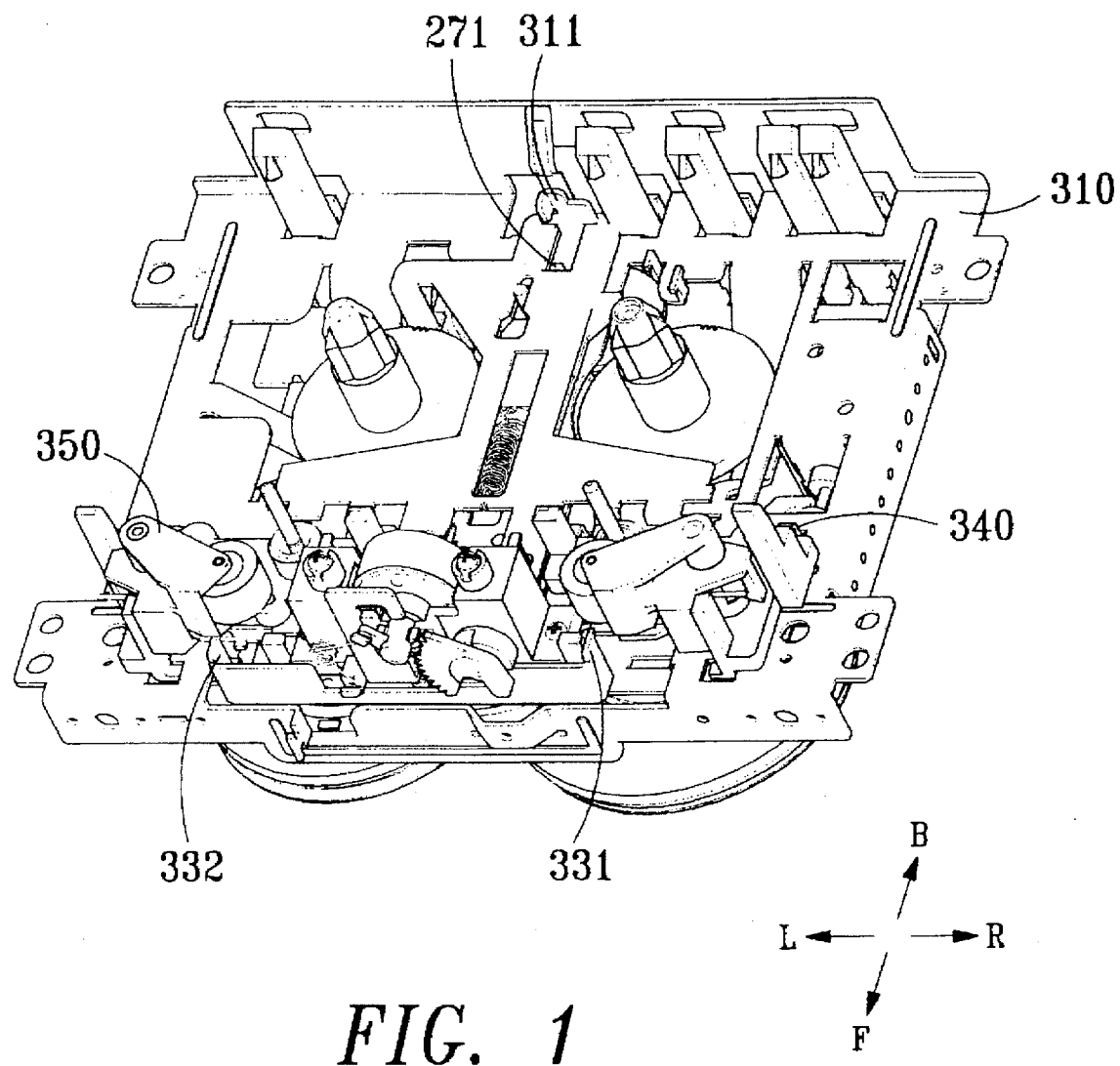
FIG. 1 is a perspective view of the preferred embodiment of the present invention.

When rudder 131 moves to a neutral position in the playback mode, before it is guided by cam 215 and cam 217 to position D as shown on FIG. 13, solenoid 200 is de-energized so that rudder 131 is held in a position to cause winding of the tape at rapid speed. This is the mode shown in FIG. 1.

The procedures for position control of playback rocking arm 450 are as follows: the rapid rotation rocking arm 130 keeps at the neutral position and the power of motor 10 is transmitted through rocking pinion 90, idle wheel 100, and playback torsion limiter 180 to playback rocking upper gear 120 for the purpose of controlling its position and that of playback rocking arm 450 as well.

Figure 14:
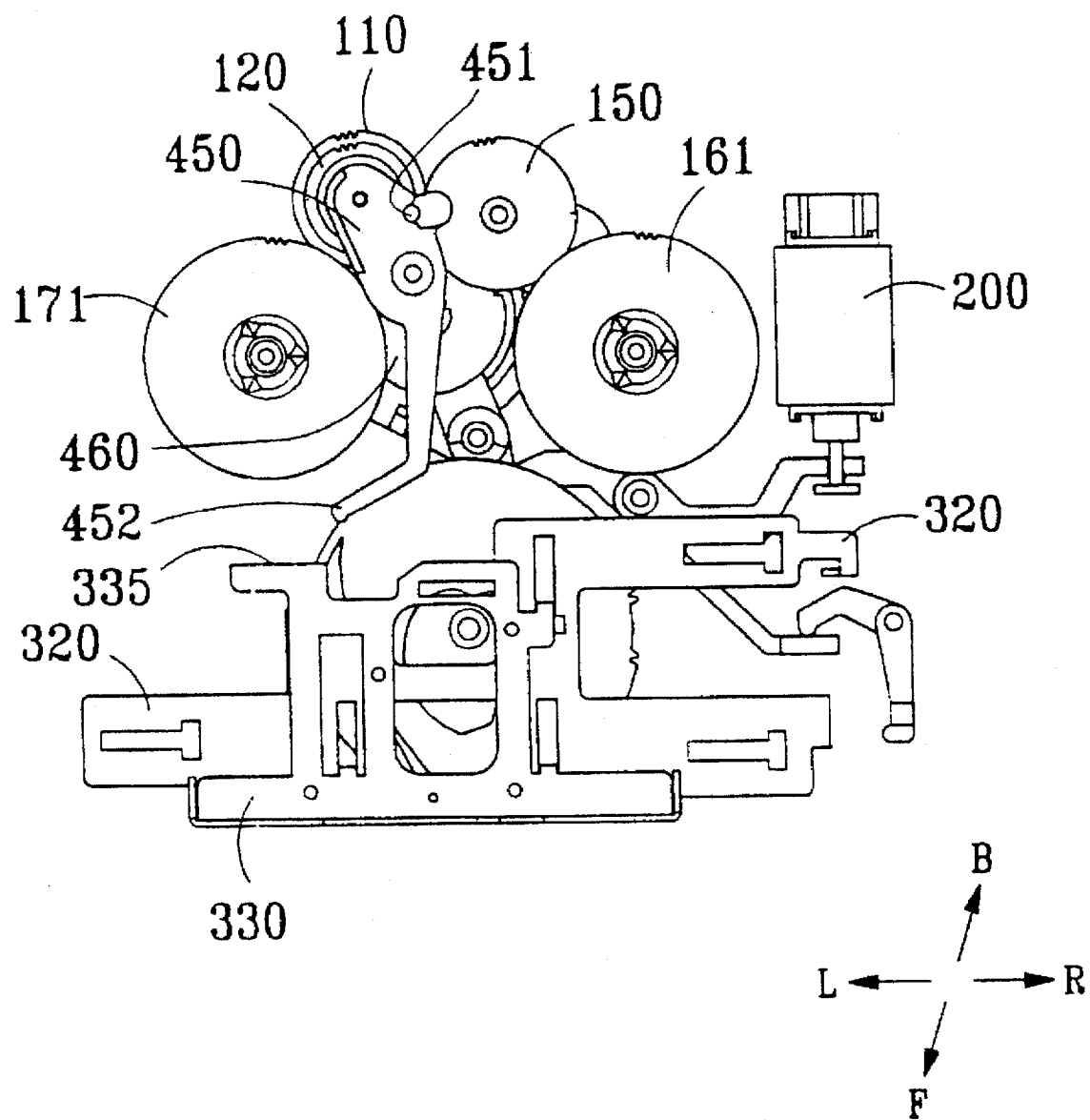
FIG. 14 shows a portion of the power transmission and mode change mechanism of the present invention.
Figure 15:
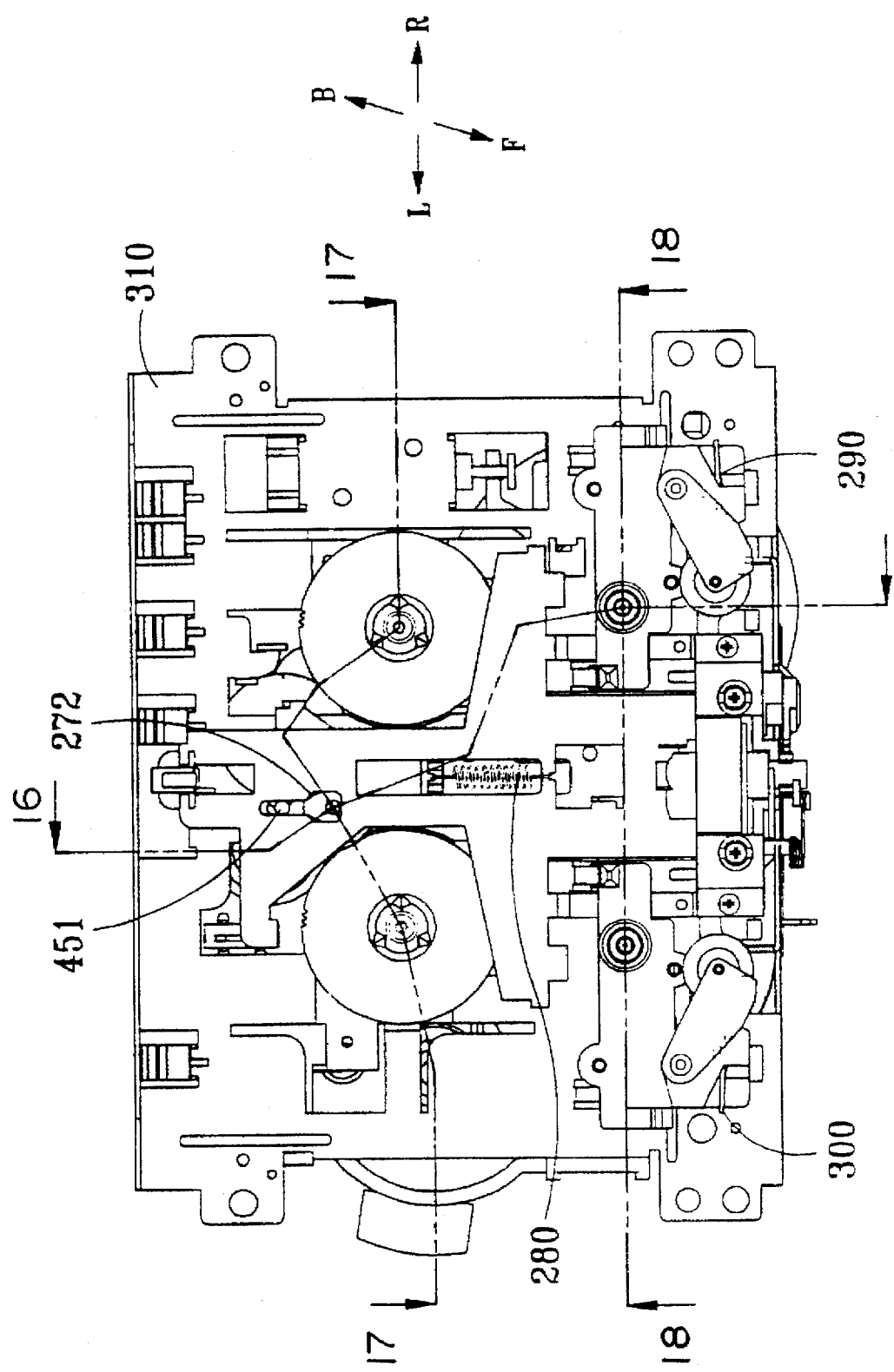
FIG. 15 is a top view of the mechanism of the present invention when in a stop state.
Figure 16:
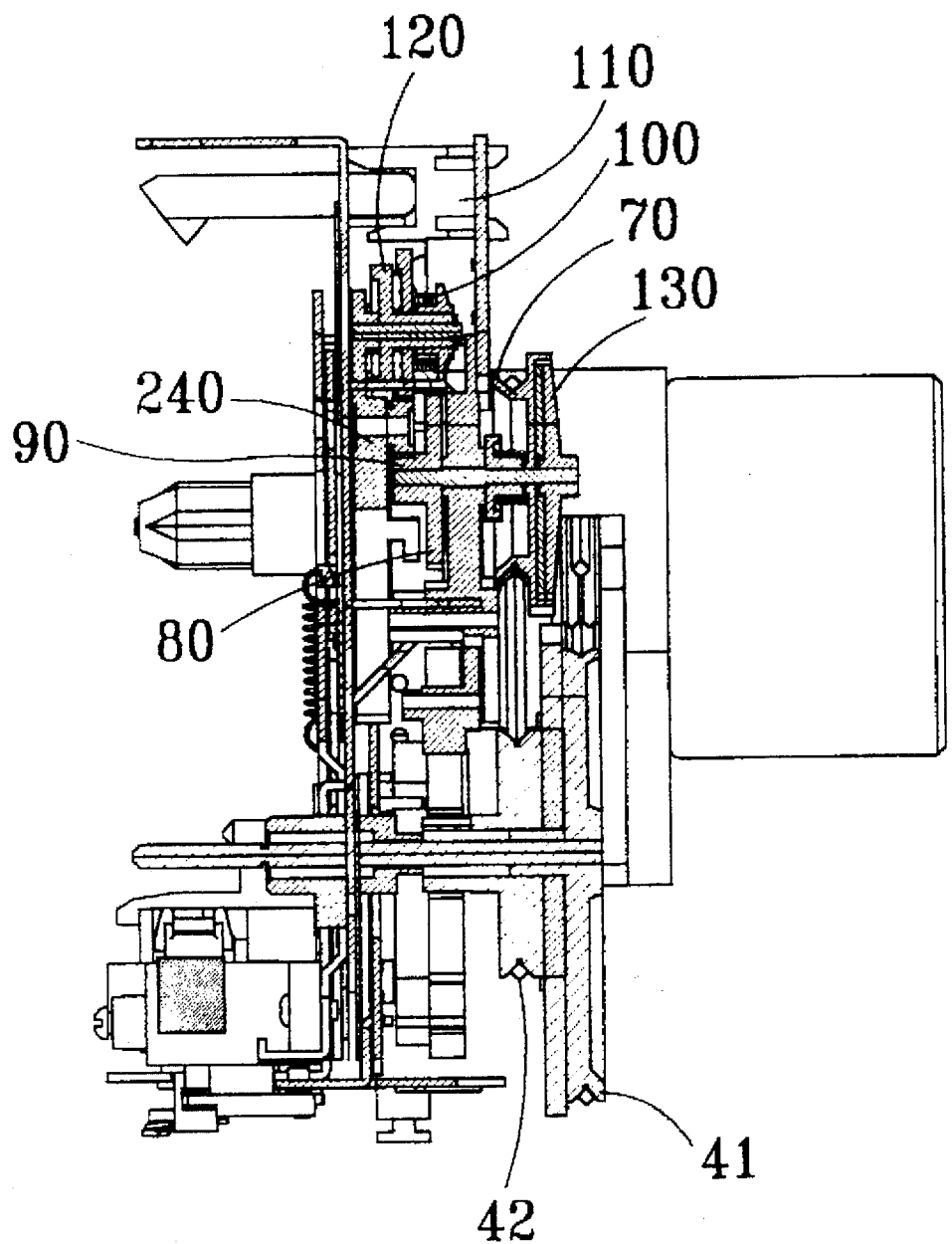
FIG. 16 is a cross-sectional view taken along line A—A of FIG. 15.
Figure 17:
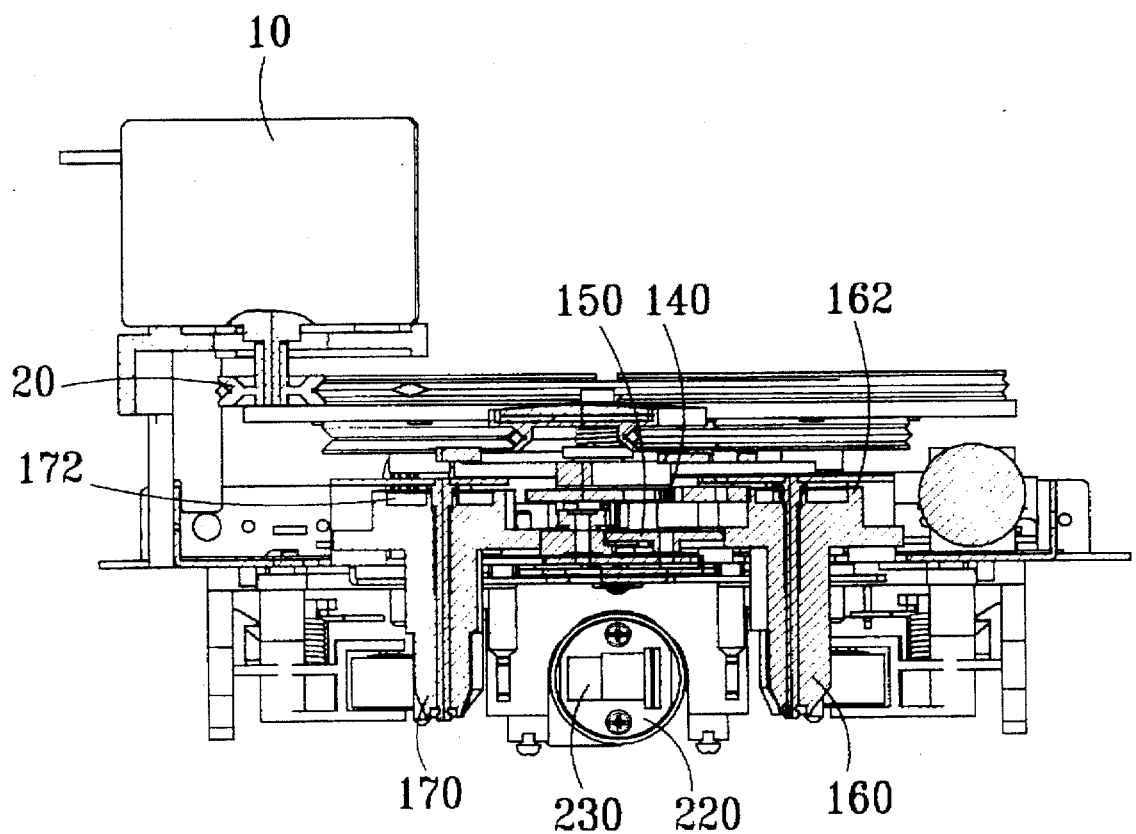
FIG. 17 is a cross-sectional view taken along line B—B of FIG. 15.
Figure 18:
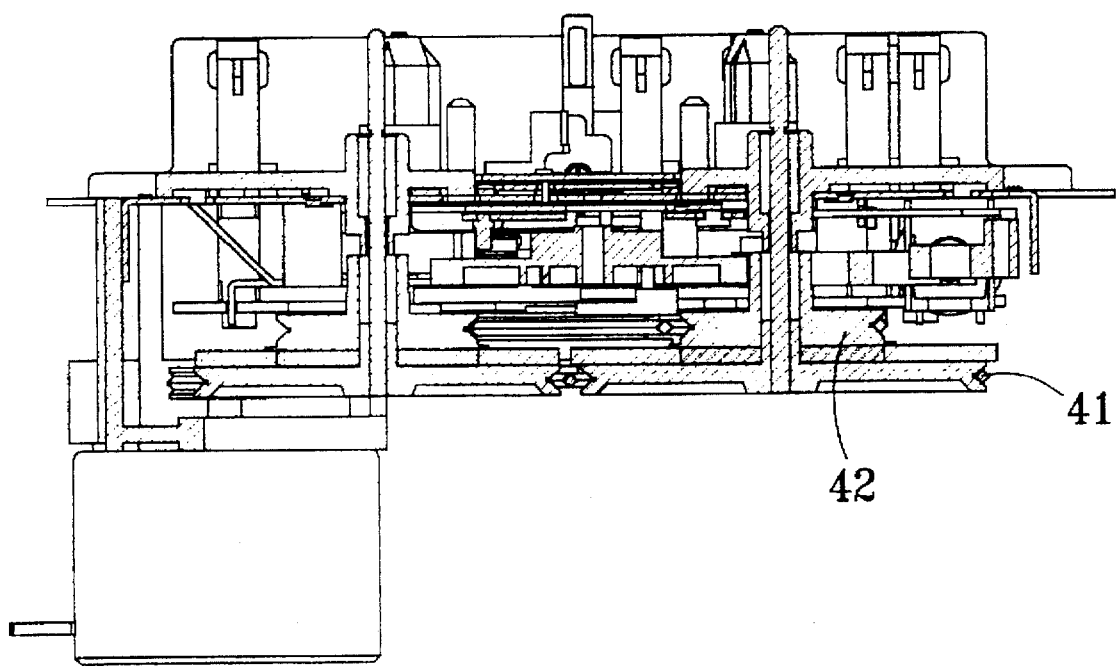
FIG. 18 is a cross-sectional view taken along line C—C of FIG. 15.

When head 230 is in the forward position, slide plate 330 for controlling the playback rocking arm stays at the same position shown in FIG. 14, at which time the relative positions between projection 335 and terminal point 452 do not contact each other, and rudder 451 is bound at the neutral position by slide groove 272 until sliding plate for magnetic head base 270 reaches the playback mode position shown in FIG. 15 and FIG. 19. At this moment, forward slide plate 260 drives plate 330 to the playback mode position, projection 335 engages terminal point 452 to cause playback rocking upper gear 120 to mesh with playback idle wheel 150, projection 331 presses forward pinch roller assembly 30, and forward pinch roller 341 presses against forward capstan spool 44 to accomplish the forward playback mode.

Similar to the above mentioned direction control mode for head 230, when head 230 is at its backward position, slide plate 330 for controlling the playback rocking arm is pushed to the left together with directional slide plate 320 by cam 213, and projection 335 will not contact terminal point 452 when the slide plate reaches the playback mode position. In addition, rudder 451 is free from the control of slide groove 272, and therefore restoring spring 461 pulls playback rocking arm 450 so that playback rocking upper gear 120 and backward playback gear 171 mesh with each other, at which moment projection 332 pushes backward pinch roller assembly 350 to make backward pinch roller 351 press against backward capstan spool 52 to accomplish the backward playback mode.

The invention thus provides a simple but reliable logic controlled cassette tape recording and/or reproducing apparatus employing a partially toothed cam mechanism together with a unique power transmitting technology which reduces the conventional logic controlled cassette tape recorder mechanism's high cost and simplifies construction.

Many changes and modifications in the above described embodiment of the invention can of course be carried out without departing from the scope thereof. Accordingly, to promote the progress in science and the useful arts, the invention is disclosed and is intended to be limited only by the scope of the appended claims.

What is claimed is:

1. A logic controlled cassette tape recording and/or reproducing apparatus, comprising:
a single motor;
a rapid rotation rocker arm having a pinion and playback gear mounted thereon, said playback gear and pinion being driven by the motor, and said rocker arm being arranged to be moved between positions in which one of the playback gear and pinion engages a tape winding reel for respective forward play and fast forward winding, and positions in which one of the playback gear and pinion engages a tape take-up reel;

a playback torsion limiter including a playback rocking lower gear, pad, and playback rocking upper gear;

a rapid rotation rocker arm torsion limiter including said pad, a disk base, a spring, and a belt pulley;

a capstan driven by the motor and having an idler gear mounted thereon;

a partially toothed cam gear having teeth arranged to mesh with those of the idler gear, and gaps in the teeth which, when adjacent the idler gear, prevent power from being transmitted between the idler gear and the partially toothed cam gear, driving of the partially toothed cam gear being stopped at one of four predetermined positions by engagement of a cam controlling rocking arm driven by a single solenoid;

means for controlling a playback rocking arm, said means for controlling the playback rocking arm including an arm-controlling slide plate arranged to move in a left/right direction together with a directional slide plate, and in a forward/backward direction in response to movement of a forward slide plate on which a head is mounted, such that when the head is in a forward position, the arm-controlling slide plate causes the playback rocking arm to move the playback gear to engage the winding reel, and when said head is in a backwards position, the arm-controlling slide plate causes the playback gear to engage the take-up reel, said playback rocking arm being thereby driven by the arm-controlling slide plate and also guided by a slide groove in a magnetic head slide plate when the apparatus is not in a playback mode;

wherein all positions of the rapid rotation rocker arm are controlled by a cam mounted on a surface of the partially toothed cam gear, said positions including a neutral position utilized during playback or stoppage in which the pinion engages neither of the winding and take-up reels;

and wherein the forward slide plate is positioned by means of a drive rudder whose position is determined by a head position controlling cam on the partially toothed cam gear, the drive rudder passing through the slide plate to also cause the arm-controlling plate to move together with the forward slide plate.

2. Apparatus as claimed in claim 1, wherein the cam controlling rocking arm is arranged to move the directional slide plate and simultaneously the arm-controlling slide plate to move the playback rocking arm right and left, a pulling force of the solenoid together with movement of the cam on the partially toothed cam gear causing the directional slide plate to move to a backward rewinding reel side and thus reversibly control the head, the head holding a forward position so long as a rudder of the directional slide plate is disengaged from the head position controlling cam, the cam pushing the directional slide plate to the forward winding reel side so that the head may return to the forward position upon return to a stopping mode.

3. Apparatus as claimed in claim 1, wherein position control for the playback rocking arm is such that when rotating in a positive direction, it is controlled by a projection provided on the arm-controlling slide plate, and when rotating in a reversed direction, it is controlled by a restoring spring, while its neutral position is controlled by said slide groove provided in one of the magnetic head or forward slide plate.

4. Apparatus as claimed in claim 1, wherein forward and backward position control for the playback rocking arm is determined by the right and left positions of the arm-controlling slide plate together with said slide groove in one of the magnetic head or forward slide plate.

* * * * *